April 16, 1957
G. H. BEGENT
2,788,885
CONVEYORS
Filed June 29, 1954
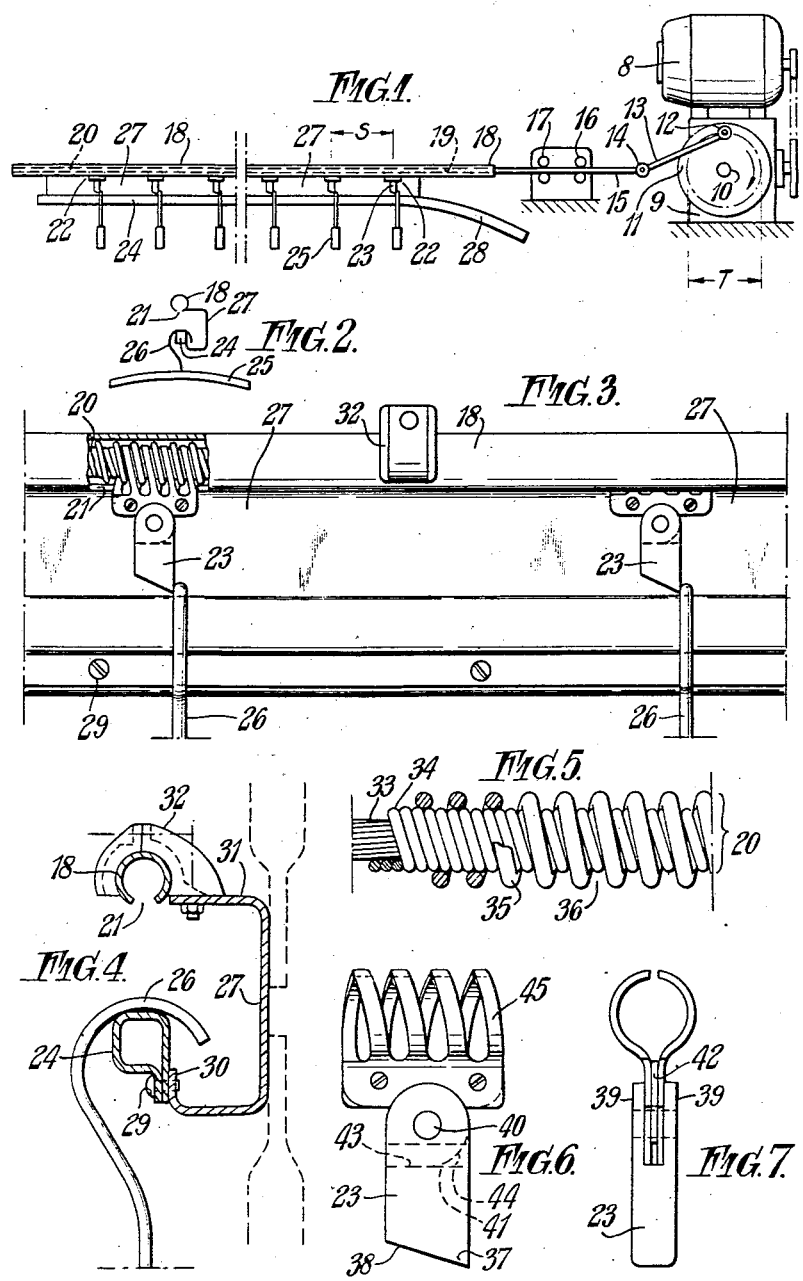
Inventor
George Henry Begent
By: Olson & Trexler Attys.

2,788,885
Patented Apr. 16, 1957

United States Patent Office

2,788,885
CONVEYORS

George Henry Begent, Hainault, England, assignor to Teleflex Incorporated, Wilmington, Del., a corporation of Delaware Application June 29, 1954, Serial No. 440,202

7 Claims. (Cl. 198—221)

This invention relates to conveyors for the step-by-step movement of parts to be conveyed and according to the invention there are provided two main members which are caused to have relative reciprocating movement and one of which, preferably the fixed member, supports the parts to be conveyed whilst the other, preferably the movable member, has a plurality of similar pawl members spaced apart in the reciprocating path at distances less than the reciprocating movement. These pawls are controlled by gravity, weight or spring means or any combination thereof and in the feed movement engage the parts to be conveyed or carriers therefor to feed them forwardly and in the reverse direction slip or pass-by the parts to be conveyed or their carriers to re-assume a position for the next feeding step.

Although the movable member which in preferred cases carries the pawls can be stiff, yet in most cases it is flexible and constituted by a multi-stranded relatively flexible cable or a chain mounted for movement in suitable guiding and supporting means preferably comprised by a fixed guiding conduit slotted for the passage of the connecting means for the pawls.

As will be obvious, the path along which the parts or their carriers are caused to move in the main will be rectilinear but it must be understood this path can include curved portions and in all cases the guiding and supporting means provided are such that they maintain the moved parts operating in the working path.

Flexible cables particularly suitable for use as reciprocating members for structures in accordance with the present invention are multi-stranded flexible cables having a helical projection on the exterior such as set forth in the specifications of United States Patents Nos. 1,983,962 and 2,551,546.

It will be understood that by using these particular or similar cables not only is the advantage of relative flexibility obtained, especially when the working path includes curves in a horizontal plane or curves in a vertical plane or curves in combined planes, but also the grooves or spaces between the projecting turns of the helix can be utilized for the mounting of attaching members which carry the pawls.

In carrying the invention into effect, any suitable motor means may be employed to impart the reciprocating movement to the movable member, operating from one end thereof or from both ends. For example, where a relatively stiff cable is employed such for example as those according to the two before-mentioned United States Patents, there need only be a positive connection to the drive at one end as such a cable is capable of transmitting both pull and push. However, even with such cables and also particularly for a chain, the drive can be at both ends. For example, it can be a positive reciprocating drive at one end whilst at the other end there can be a spring or weight return, the purpose being to keep the pawls at their relative spacing both when they are performing their operative stroke and also on the return stroke. Still further, in some cases for cables and chains the path may be endless although only a reciprocating movement is imparted to the said cables or chains.

In order that the invention may be better understood, it will now be described with reference to the accompanying drawings in which:

Fig. 1 is a schematic diagram of one method of carrying the invention into effect.

Fig. 2 is a similar view of one end thereof with parts omitted.

Fig. 3 shows an elevation to a much larger scale of a portion of the mechanism involved in the structure diagrammatically illustrated in Figs. 1 and 2.

Fig. 4 is an end elevation of Fig. 2 with certain parts omitted.

Fig. 5 is an enlarged view of a portion of a cable utilised in structures as shown in Figs. 1 to 4.

Fig. 6 is a side elevation and Fig. 7 an end elevation of a pawl and its carrier to the scale of the cable shown in Fig. 5 and for mounting on such cable.

In reference to Figs. 1 and 2, 8 is an electric motor drivingly connected to a reduction gear box 9 the output shaft 10 of which has mounted thereon a plate 11 with a crankpin 12 on which one end of a connecting rod 13 is mounted, the other end 14 being pivoted to one end of a reciprocating rod 15 mounted to slide between suitably supported spaced guide rollers 16 and 17. The other end of the rod 15 enters one end of a tubular guiding conduit 18 and is secured at 19 to one end of a flexible cable 20 (of the type hereafter explained) mounted to reciprocate in said conduit. The conduit 18, as can be seen from Fig. 2, has a longitudinal slot 21 on its underside and through this slot carriers 22 secured to the cable 20 project. The projecting portions of these carriers 22 have pivoted thereto gravity hanging pawls 23 and the arrangement is such that the spacing S between the pawls is similar throughout and this spacing S is less than the throw T of the crankpin 12 (that is, the linear movement of the pawls per stroke).

24 is the fixed member or support for the parts to be moved and this is arranged below and parallel to the guiding conduit 18 with its inner cable 20 constituting the movable part. Although only a short portion of these movable and fixed members is shown in Fig. 1 and, further, although these portions are rectilinear, it will be understood that they can be of much greater length and can include curved portions.

The noses of the pawls come close to the upper surface of the support 24, and the goods to be conveyed in the example illustrated are coat hangers 25 the suspending hooks 26 of which come upon and project slightly above the upper surface of the fixed member 24. In Figs. 1 and 2 no garments are shown on the coat hangers but these are omitted for the sake of clearness. The conduit 18 and fixed member 24 are secured to a trunking member 27 which is not shown supported in Figs. 1 and 2 but which can be supported in any suitable manner. For example, it can be attached to hangers from girders or the like or to standards from the floor (both of which are indicated in Fig. 4), or to a wall, or may include these or any other suitable methods of support.

In operation it will be understood that at the feeding end of the support 24 the garment hangers with the garments thereon are placed upon the fixed member 24 to come within the zone of action of the first pawl. When the mechanism is operating, at the end of the return stroke this end pawl has slipped over the projecting upper portion of the hook 26 so that at the next positive forward movement the pawl engages this projecting portion and moves the garment hanger with the garment forwardly towards the delivery end until the end of the feed movement is reached when upon the return movement the garment hanger is left in the position to which it has been fed. Towards the end of the following return stroke, the next pawl slips over this projecting portion of the garment hanger and comes on the other side thereof as the linear movement T of the pawls is greater than their spacing S. As a consequence, upon the next feeding movement the second pawl carries the garment hanger still further and the action is repeated from pawl to pawl. In the meantime, however, of course other garment hangers may be mounted on the feeding end of the fixed member 24 so that in normal working throughout the length of the conveyor various garment hangers with their garments are being fed forward step by step towards the delivery end. In the drawing the delivery end is diagrammatically shown as a downwardly curving portion 28 and this is so disposed that the feeding movement of the last pawl brings the garment hanger with which it is in contact on to this delivery portion so that the garment hanger with its garment slips down by gravity to the delivery position, which may in some cases be the feed end of another conveyor.

Figs. 3 and 4 show to a much larger scale certain parts shown in Fig. 1 and from these the construction of the conduit 18 with its longitudinal slot 21 on the underside will be appreciated. Further, the supporting member 24 is comprised by a bent sheet metal section with rounded edges and lower flanges, these latter forming attaching means for screws 29 to an upwardly projecting flange 30 at the lower portion of the trunking member 27 having the section shown which includes an upper flange 31 having spaced brackets 32 secured thereto (one only being shown in Figs. 3 and 4) which carry the slotted guiding conduit 18.

A portion of the relatively flexible cable utilised is shown to a still larger scale in Fig. 5 and this is fabricated in accordance with the before mentioned United States Patent No. 2,551,546. As will be seen, it comprises a multi-stranded core 33 for the transmission of tension, having therearound a multi-start lay 34 generally for the transmission of compression, this latter having wound on the exterior so as to be tightly gripped thereby a wire 35 of larger section laid in a helical manner to leave helical grooves 36 between its turns.

The pawls 23 utilised are hanging pawls and comprise a nose 37 at the lower end and the lower bounding portion of which inclines upwardly by a surface 38 to enable the pawls to slip over the projections of the goods to be conveyed or their carriers on the return movement. The upper end of the pawl 23 is forked and the limbs 39 thereof are apertured for a pivot 40. The inner bounding portion of the fork between the limbs 39 is comprised by a flat surface 41.

The means for attaching these pawls to the cable is comprised by two clip members of similar construction but handed. These are formed from sheet metal and each comprises at its lower end an apertured lug to come within the fork of the pawl and for the pivot 40 to pass therethrough as well as through a spacing member 42.

The lower bounding edge of these lugs each comprises a flat square surface 43 and a rounded surface 44, these surfaces being so shaped and disposed that the surface 43 forms an abutment for the surface 41 of the pawl to prevent further movement or turning of the pawl in one direction, whilst the surface 44 is so radiused that it allows the movement of the pawl in the other direction. These movements are so designed that the abutments come into contact during the feeding movement of the pawl whilst the turning movement of the pawl is permitted on the return movement of the conveyor. Each clip member above its lug is expanded and from this expanded portion proceed four upwardly inclined fingers 45. These are given a curved formation as shown in Fig. 7 so that they are substantially semicircular and the fingers are so inclined and spaced that the parts can be assembled around the cable, Fig. 5, and by this assembly the fingers 45 enter four of the helical grooves 36 of the cable 20. When so assembled, the lower part of the assembly that comes just above the pawls, passes out through the slot 21.

It will be understood in action the cable 27 does not rotate about its own axis but simply has the reciprocating movement imparted thereto. As a consequence it will be appreciated that the fingers do not rotate or have any turning moveemnt in the helical grooves 36 but simply act to secure the double clip device in position so that it constitutes the carrier for its associated pawl.

Where a chain is used, its links can be of a nature suitable for the particular purpose and the cross section of the guiding conduit in which it slides correspondingly shaped. The connecting means for carrying the pawls preferably are of such nature that they engage in at least two but preferably more than two links.

Where step-by-step conveyors constructed in accordance with the invention include in their path of travel upwardly extending inclines, to prevent any possibility of the parts to be moved or their carries from slipping back there may be combined with the relatively fixed member suitable spring, gravity or otherwise operable detents, springs, catches or the like to hold the parts in the positions to which they have been set and ready for the next forward movement.

It, of course, will be appreciated that where required the carriers for the parts to be moved may include a wheel or wheels in their structure to run upon a suitable cooperating relatively fixed member.

The invention is not limited to the precise forms or details of construction herein described, as these may be varied to suit particular requirements.

The invention is claimed as follows:

1. A step-by-step conveyor comprising a fixed member and a movable member caused to reciprocate relative to the fixed member, the fixed member being spaced from and arranged parallel to the movable member and adapted to support the parts to be conveyed, the movable member having connected thereto a plurality of similar pawl members spaced apart at equal distances, which distances are less than the reciprocating movement, said movable member comprising a multi-stranded cable having on its exterior a projecting helix the turns of which are spaced apart and being mounted to slide in a correspondingly shaped conduit having a longitudinal slot therein, each pawl being connected to the cable by a carrier which passes through said slot, said carrier including fingers to be located in grooves between the spaced helical turns of the cable, and driving means for reciprocating said movable member.

2. A step-by-step conveyor comprising a horizontally disposed fixed member and a movable member spaced apart and parallel to said fixed member and adapted to reciprocate relative to the fixed member, said fixed member adapted to support the parts to be conveyed, a plurality of similar gravity pawl members connected to said movable member at spaced apart equal distances less than the reciprocating movement, said movable member comprising, a flexible cable having a plurality of projections spaced longitudinally thereon and mounted in a tubular member with a longitudinal slot provided therein, each pawl being connected to said cable by a carrier extending through said longitudinal slot, said carrier including a plurality of generally semi-circular fingers in substantially confronting relation and engageable with and embracing said cable between said projections, extending through said slot, and driving means for reciprocating said movable member.

3. A conveyor of the type set forth in claim 2 wherein said movable member includes a multi-stranded cable having on its exterior a projecting helix, the turns of which are spaced apart and provide said projections.

4. A conveyor as set forth in claim 2, and further including a support member for said fixed member and said tubular member, comprising a substantially U-shaped portion, the bight of said U-shaped portion adapted for attachment to vertical support, said fixed member carried by one arm of said U-shaped member and said tubular member carried by the other arm of said U-shaped member, whereby the groove in said tubular member is directly opposite said fixed member and the parts are conveyed uninterruptedly along said fixed member.

5. A step-by-step conveyor comprising a fixed member for supporting parts to be conveyed, a reciprocably mounted moveable member disposed substantially parallel to said fixed member, said moveable member having a plurality of projections spaced longitudinally thereon, a plurality of pawl members spaced apart substantially equal distances along said moveable member, which distances are less than the reciprocating movement of the moveable member, and a plurality of carriers respectively connecting said pawl members to said moveable member, each of said carriers including fingers disposed in grooves between said projections on said moveable member and cooperable with said projections for providing a driving connection between the moveable member and said carriers.

6. A conveyor, as defined in claim 5, wherein the fingers of each of said carriers comprise a plurality of members in substantially confronting relation and engageable with and embracing said moveable member between said projections.

7. A conveyor, as defined in claim 5, wherein said moveable member includes a cable comprising an exterior helical element which provides said projections.

References Cited in the file of this patent

UNITED STATES PATENTS

| | | |
|---|---|---|
| 731,003 | Willson | June 16, 1903 |
| 2,404,885 | Pile | July 30, 1946 |
| 2,536,575 | Seldin | Jan. 2, 1951 |
| 2,557,170 | Bjorlo | June 19, 1951 |
| 2,627,968 | Thompson | Feb. 10, 1953 |